United States Patent [19]

Todaka et al.

[11] Patent Number: 5,744,172
[45] Date of Patent: Apr. 28, 1998

[54] EXTRUSION MOLDING MACHINE

[75] Inventors: Nobuhiko Todaka, Toyota; Yoichi Hirai, Obu, both of Japan

[73] Assignee: Tokai Kogyo Kabushiki Kaisha, Obu, Japan

[21] Appl. No.: 759,810

[22] Filed: Dec. 3, 1996

[30] Foreign Application Priority Data

Dec. 5, 1995 [JP] Japan ................... 7-316641
Sep. 24, 1996 [JP] Japan ................... 8-251961

[51] Int. Cl.⁶ .......................................... B29C 47/02
[52] U.S. Cl. ......................... 425/113; 264/252; 425/466
[58] Field of Search ........................ 425/113, 466; 264/252

[56] References Cited

U.S. PATENT DOCUMENTS 3,595,203  7/1971  Fabulich ........................... 118/683
3,685,484  8/1972  Patterson .......................... 118/63
5,362,428  11/1994  Tsujino et al. .................... 425/113
5,507,994  4/1996  Cornils et al. .................... 425/113

FOREIGN PATENT DOCUMENTS

0638408 A1  7/1994  European Pat. Off. .
0707937 A1  10/1995  European Pat. Off. .
6-191269  7/1994  Japan .

Primary Examiner—James P. Mackey
Attorney, Agent, or Firm—Dennison, Meserole, Pollack & Scheiner

[57] ABSTRACT

An extrusion molding machine for manufacturing a panel unit including a panel and a frame mounted on a peripheral edge of the panel. The extrusion molding machine includes molding die for forming the frame on the peripheral edge of the panel by extrusion molding. The molding die are adapted to follow the fluctuation of the peripheral edge of the panel caused by variation of curvature of the panel.

10 Claims, 8 Drawing Sheets

EXTRUSION MOLDING MACHINE

BACKGROUND OF THE INVENTION

1. Field of the Invention

The present invention relates to an extrusion molding machine having a molding die for extrusion molding a frame, such as a windshield molding, a dam rubber and a gasket, along a peripheral edge of a panel, such as a windshield glass of an automobile.

2. Description of the Prior Art

A conventional extrusion molding machine is shown, for example, in Japanese Laid-Open Patent Publication No. 6-191269. As shown in FIGS. 8 to 10, such a conventional extrusion molding machine includes an extruder 105, and a molding die 113 fixedly connected to a forward end of the extruder 105 by fixture bars 106. The molding die 113 communicates with the extruder 105 through a rigid feeder pipe 131. The molding die 113 has an extrusion port 114 for forming a frame 112 along a peripheral edge of a panel 111. The extrusion port 114 includes an upper opening 114a which opens in an upper surface of the molding die 113 and includes a molding opening 114b having a configuration corresponding to the cross section of the frame 112.

On the other hand, a robot 101 for handling the panel 111 is located near the extrusion molding machine. The robot 101 is of a six-axes type, and includes a support arm 102 and a panel retainer unit 104 mounted on the distal end of the support arm 102. As will be easily understood, the robot 101 can be controlled so that the panel 111 retained by the panel retainer unit 104 is three-dimensionally moved.

First, as shown in FIGS. 9 and 10, the robot 101 is operated to move the panel 111 so that the upper opening 114a of the extrusion port 114 of the molding die 113 faces a peripheral edge of the panel 111. Subsequently, the robot 101 is further operated by a signal corresponding to a predetermined operational program to continuously move the panel 111 in such a manner that the extrusion port 114 of the molding die 113 moves along the peripheral edge of the panel 111. Simultaneously, molding material is extruded from the extrusion port 114. Thus, the frame 112 is continuously formed on the panel 111 so as to extend along the peripheral edge of the panel 111, thereby forming a panel unit.

According to this prior art extrusion molding machine, when the panel 111 is moved so that the extrusion port 114 of the molding die 113 moves along the peripheral edge of the panel 111, the extrusion port 114 of the molding die 113 may be apart from or excessively pressed to the peripheral edge of the panel 111. This is because the peripheral edge of the panel 111 may displace in the direction as shown by an arrow A in FIG. 9 since the panel 111 is a curved one which may inherently have irregularity in its curvature. If the extrusion opening 114 is apart from the peripheral edge of the panel 111 during the extruding operation of the molding material, the frame 112 as extruded exhibits little or insufficient adhesive force to the peripheral edge of the panel 111. This may lead to formation of a defective product.

Conversely, if the extrusion opening 114 is excessively pressed to the peripheral edge of the panel 111 during the extruding operation of the molding material, the panel 111 may be damaged.

Further, according to this prior art extrusion molding machine, the molding die 113 may deviate off its predetermined path. This is because the molding die 113 may displace in the direction as shown by an arrow B in FIG. 10 because of thermal expansion of the feeder pipe 131 since the molding die 113 is fixedly connected to the forward end of the extruder 105 by the fixture bars 106 and the feeder pipe 131.

If the molding die 113 deviates off the predetermined path during the extruding operation of the molding material, the frame 112 cannot be extruded at a desired position. This may also lead to formation of a defective product.

SUMMARY OF THE INVENTION

It is an object of the present invention to provide an extrusion molding machine in which the problem associated with the conventional extrusion molding machine, that is, a frame may be preferably formed on a peripheral edge of a panel if the panel has irregularity in its curvature.

It is another object of the present invention to provide an extrusion molding machine in which the problem associated with the conventional extrusion molding machine, that is, a frame may be preferably formed on a peripheral edge of a panel if a feeder pipe is thermally expanded.

In order to attain the objects, the present invention provides an extrusion molding machine for manufacturing a panel unit including a panel and a frame mounted on a peripheral edge of the panel. The extrusion molding machine includes molding die means for forming the frame on the peripheral edge of the panel by extrusion molding. The molding die means are adapted to follow the fluctuation of the peripheral edge of the panel caused by variation of curvature of the panel.

With the extrusion molding machine, the frame as extruded is reliably adhered to the peripheral edge of the panel if the panel has irregularity in its curvature. Additionally, the panel cannot be damaged since the molding die means is never excessively pressed to the peripheral edge of the panel.

The extrusion molding machine may include bias means for forcing the molding die means to the peripheral edge of the panel.

The extrusion molding machine may include support means for supporting the molding die means. The support means are forced to the peripheral edge of the panel by the bias means.

The extrusion molding machine may include a fixture member for movably supporting the support means. The bias means is mounted on the fixture member.

The bias means may be a spring of which one end engages the support means. Further, the bias means may include an adjusting member for adjusting spring force of the spring.

With this construction, the spring force of the spring can be properly adjusted so that the biasing force applied to the support means is preferably controlled.

The bias means may be an arm member having one end and the other end, and a weight unit removably provided on one end of the arm member. The arm member is pivotally supported on the fixture member and engaged with the support means at the other end thereof. Further, the weight unit may be essentially constituted of a plurality of weight strips.

With this construction, the biasing force applied to the support means can be preferably controlled by changing the number of the weight strips.

The molding die means are preferably coupled to an extruder through a flexible feeder pipe.

With this construction, the frame can be extruded at a desired position on the peripheral edge of the panel. This is because the molding die means is not displaced if the feeder pipe is thermally expanded.

Other objects and features of the invention will be more fully understood from the following detailed description and appended claims when taken with the accompanying drawings.

DETAILED DESCRIPTION OF THE PREFERRED EMBODIMENT

Preferred embodiments of the present invention will now be described in detail with reference to the drawings. In the preferred embodiments, a windshield glass of an automobile and a windshield molding extrusion molded on the windshield glass are exemplified as a panel and a frame, respectively.

Figure 1:
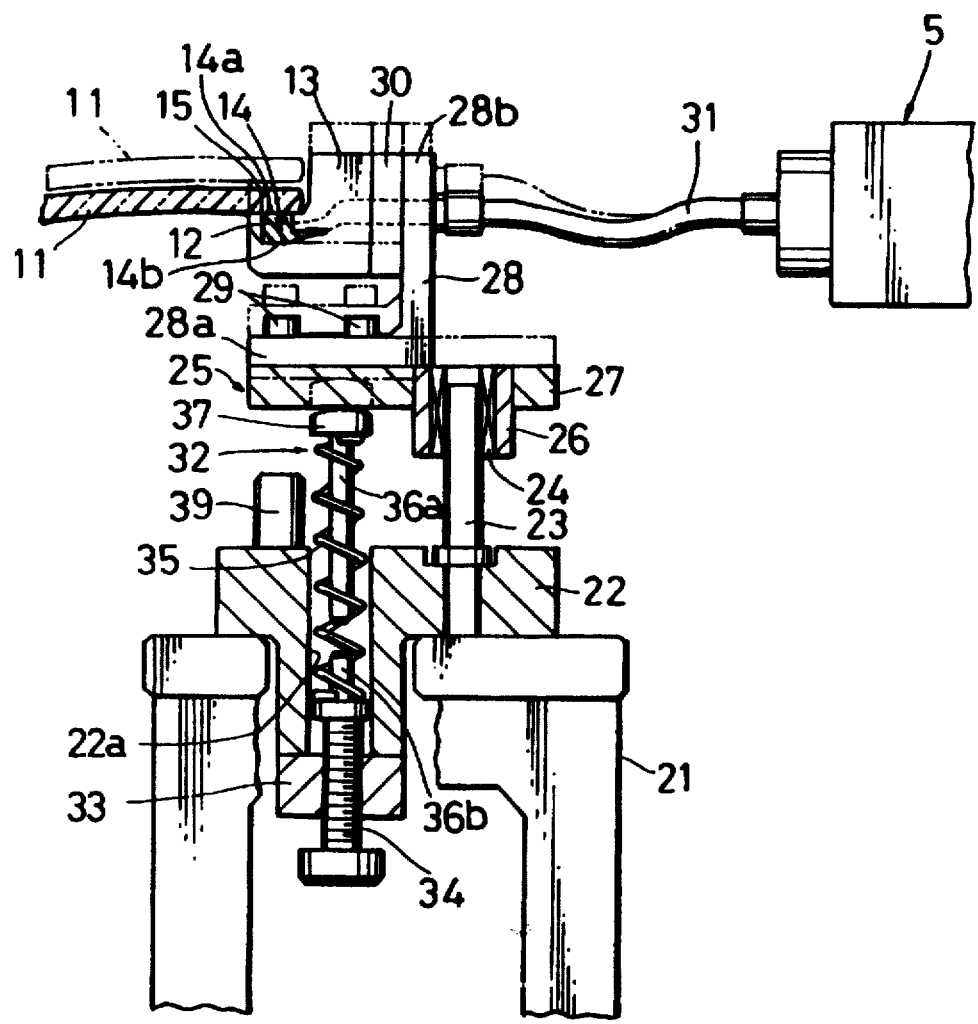
FIG. 1 is a side view, partly in section, of an extrusion molding machine according to a first embodiment of the present invention.
Figure 2:
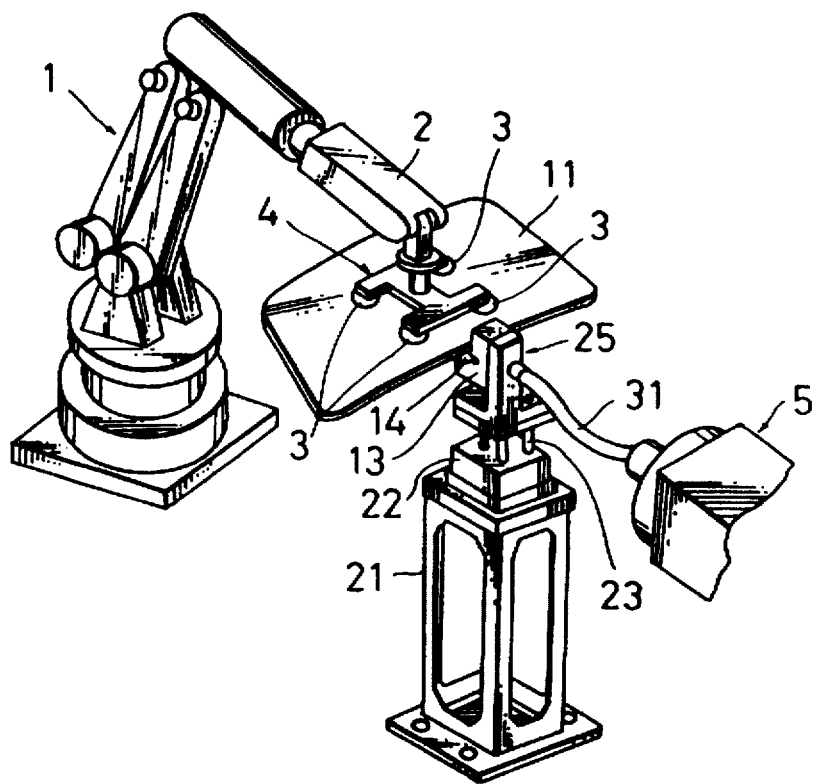
FIG. 2 is a perspective view of the extrusion molding machine and a robot for handling a panel located near the extrusion molding machine.
Figure 3:
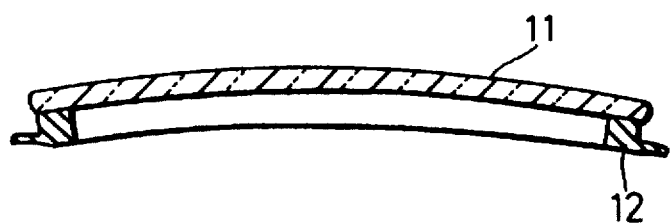
FIG. 3 is a sectional view of a panel formed with a frame.

Referring to FIGS. 1 to 3, shown therein is a first embodiment of the invention.

As shown in FIGS. 1 and 2, an extrusion molding machine includes a molding die 13 for extruding the molding material to form a windshield molding 12 on a peripheral edge of the windshield glass 11, and a movable support 25 for supporting the molding die 13. The movable support 25 is vertically movably supported on a fixture member 21.

The molding die 13 has an extrusion port 14 for forming the windshield molding 12 along the peripheral edge of the windshield glass 11. The extrusion port 14 includes an upper opening 14a which opens in an upper surface or windshield glass contact surface 15 of the molding die 13 and includes a molding opening 14b having a configuration corresponding to the cross section of the windshield molding 12. The molding die 13 is coupled to an extruder 5 for feeding molding material through a flexible feeder pipe 31 with good heat resistance so that molding material, such as an elastomer, is fed to the extrusion port 14 of the molding die 13.

The movable support 25 includes a movable block 27 and a support frame 28 mounted on the movable block 27 by fasteners 29 such as bolts. The movable block 27 has desired numbers (shown as two in number for illustration purposes) sleeves 26 mounted on its lower surface. Each sleeve 26 is provided with a sliding bearing 24 fitted therein. The support frame 28 is constituted of a horizontal base portion 28a to be fixed to the movable block 27 and a vertical portion 28b integrally provided on one end of the base portion 28a, and has a substantially L-shaped configuration in cross section. The vertical portion 28b of the support frame 28 is connected to the molding die 13 with an intervening heat insulator panel 30.

The fixture member 21 is fixed on a working floor (not shown) and has a base block 22 mounted thereon. As best shown in FIG. 1, the base block 22 is provided with two vertical guide rods 23 studded thereon which are arranged to correspond to the sleeves 26. Each vertical guide rod 23 engages the sliding bearing 24 fitted in the sleeve 26 of the movable block 27.

The base block 22 of the fixture member 21 is also provided with a pusher 32 as bias means to upwardly bias the movable support 25. As clearly shown in FIG. 1, the pusher 32 is received in a vertical through bore 22a formed on the base block 22. The pusher 32 is constituted of a headed upper rod 36a, a headed lower rod 36b spaced from and oppositely aligned with the upper rod 36a, a coil spring 35 journaled around the upper and lower rods 36a and 36b, and an adjusting bolt 34 threaded to a retainer cap 33 provided on the lower end of the through bore 22a. The upper rod 36a has a head 37 which contacts a lower surface of the movable block 27 of the movable support 25, thereby upwardly forcing the movable support 25 by spring force of the coil spring 35. Further, the adjusting bolt 34 contacts the lower end of the lower rod 36b.

Additionally, the base block 22 of the fixture member 21 is provided with a level reference member 39 which is used to position the movable support 25. A desired gage block (not shown) is inserted between the level reference member 39 and the movable block 27, and then the adjusting bolt 34 is operated, so that the movable support 25 is positioned at a desired level. As will be appreciated, many kinds of gage blocks are used, depending on the curvature of the windshield glass 11. After the movable support 25 is preferably positioned, the adjusting bolt 34 is further operated so that the spring force of the coil spring 35 is properly adjusted.

On the other hand, as shown in FIG. 2, a robot 1 for handling the windshield glass 11 is located near the extrusion molding machine. The robot 1 is of a six-axes type, and includes a support arm 2 and a panel retainer unit 4 mounted on the distal end of the support arm 2. The panel retainer unit 4 has desired numbers (shown as four in number for illustration purposes) of sucking disks 3 for releasably retaining the windshield glass 11. The sucking disks 3 are coupled to a vacuum source (not shown). When the vacuum source is energized, the sucking disks 3 stick to the windshield glass 11 so that the windshield glass 11 is retained on the panel retainer unit 4. As will be easily recognized, the windshield glass 11 is released from the panel retainer unit 4 when the vacuum source is deenergized.

The operation of the extrusion molding machine thus constructed will now be described with reference to FIGS. 1 to 3.

The desired gage block is inserted between the level reference member 39 and the movable block 27, and then the adjusting bolt 34 is operated. Thus, the movable support 25 and the molding die 13 mounted thereon are positioned at the desired level shown by phantom lines in FIG. 1. On the other hand, the vacuum source coupled to the robot 1 is energized so that the windshield glass 11 is retained on the panel retainer unit 4.

Thereafter, the robot 1 is driven to move the panel retainer unit 4, thereby engaging the peripheral edge of the windshield glass 11 with the windshield glass contact surface 15 of the molding die 13. When the peripheral edge of the windshield glass 11 is seated on the windshield glass contact surface 15, the molding die 13 and the movable support 25 are downwardly moved against the spring force of the coil spring 35. Thus, the molding die 13 is supported on a lowered level or standard level shown by solid lines in FIG. 1 with the windshield glass contact surface 15 pressed to the peripheral edge of the windshield glass 11.

Subsequently, the extruder 5 is actuated to feed the molding material into the molding die 13 through the feeder pipe 31 so that the molding material is extruded from the extrusion port 14 of the molding die 13. Simultaneously, the robot 1 is further driven by a signal corresponding to a predetermined operational program to continuously move the windshield glass 11 in such a manner that the extrusion port 14 of the molding die 13 moves along the peripheral edge of the windshield glass 11. As will be easily understood, the operational program for the robot 1 is previously determined based on the dimension, thickness and curvature of the windshield glass 11. Thus, the windshield molding 12 is continuously formed on the peripheral edge of the windshield glass 11, thereby forming a panel unit as shown in FIG. 3.

The windshield glass 11 may have inherent variation in its curvature. Therefore, when the windshield glass 11 is continuously moved by the robot 1, the level of the peripheral edge thereof to contact the windshield glass contact surface 15 may necessarily vertically fluctuate. However, even if the level of the peripheral edge of the windshield glass 11 fluctuates, the windshield glass contact surface 15 of the molding die 13 may keep preferable contact with the peripheral edge of the windshield glass 11 without being apart from or excessively pressed to the peripheral edge of the windshield glass 11. This is because the windshield glass contact surface 15 is preferably spring biased to the peripheral edge of the windshield glass 11 by the spring force of the coil spring 35, as previously described.

As a result, the windshield molding 12 as extruded is reliably adhered to the peripheral edge of the windshield glass 11. This may effectively prevent formation of a defective product. Additionally, the windshield glass 11 cannot be damaged since the windshield glass contact surface 15 is properly pressed to the peripheral edge of the windshield glass 11 during the extruding operation of the molding material.

Referring now to FIGS. 4 to 7, shown therein are second to fourth embodiments of the invention. Since each of these embodiments is partial modification of the first embodiment, only the construction which is different from that in the first embodiment will be explained.

Figure 4:
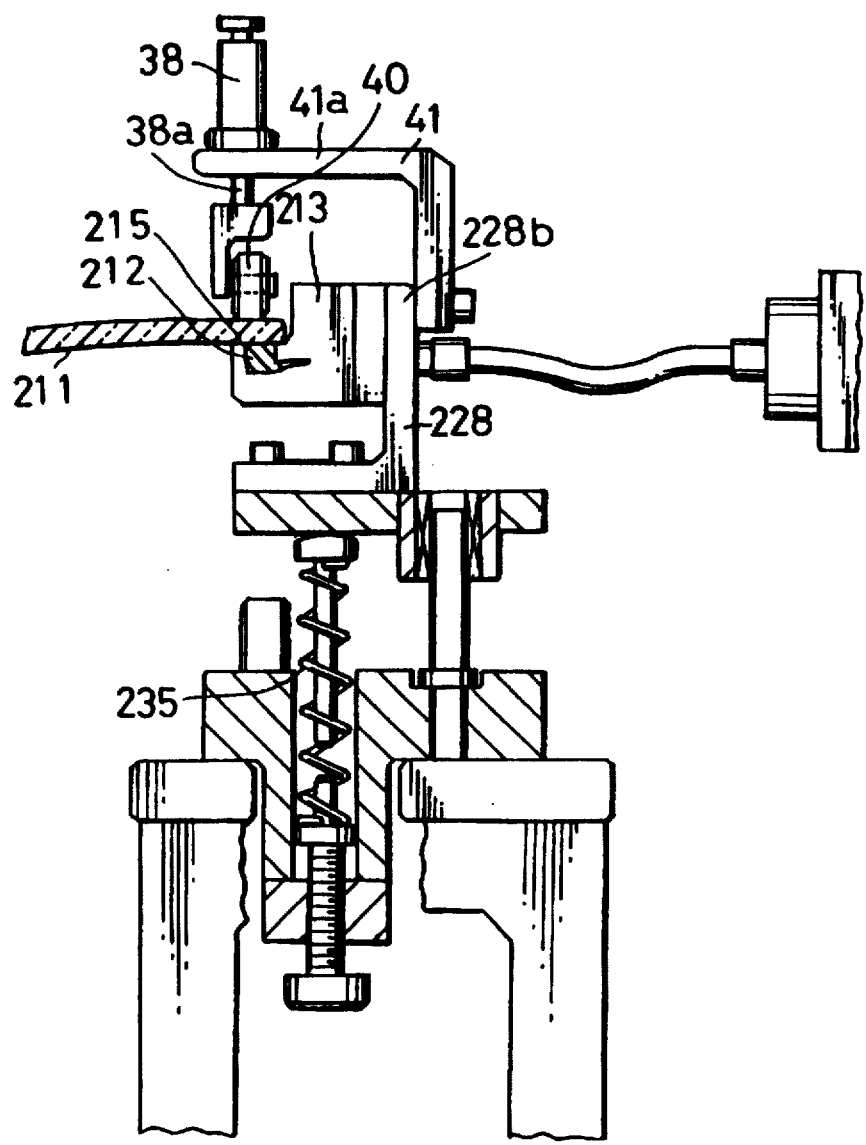
FIG. 4 is a side view, partly in section, of an extrusion molding machine according to a second embodiment of the present invention.

Referring to FIG. 4, shown therein is the second embodiment of the invention.

In this embodiment, an L-shaped bracket 41 is mounted on the upper end of a vertical portion 228b of a support frame 228. The bracket 41 includes a horizontal arm portion 41a on which a damper 38 is vertically mounted. The damper 38 includes a damper rod 38a of which the lower end is provided with a hold-down roller 40. The hold-down roller 40 is adapted to contact a peripheral edge of a windshield glass 211 seated on a windshield glass contact surface 215 of a molding die 213 so as to provide preferable down force thereon or diminish upward motion thereof.

According to this embodiment, a windshield molding 212 as extruded is further reliably adhered to the peripheral edge of the windshield glass 211. Further, a coil spring 235 may be one having reduced spring force since the peripheral edge of the windshield glass 211 is downwardly forced through the hold-down roller 40 of the damper 38.

Figure 5:
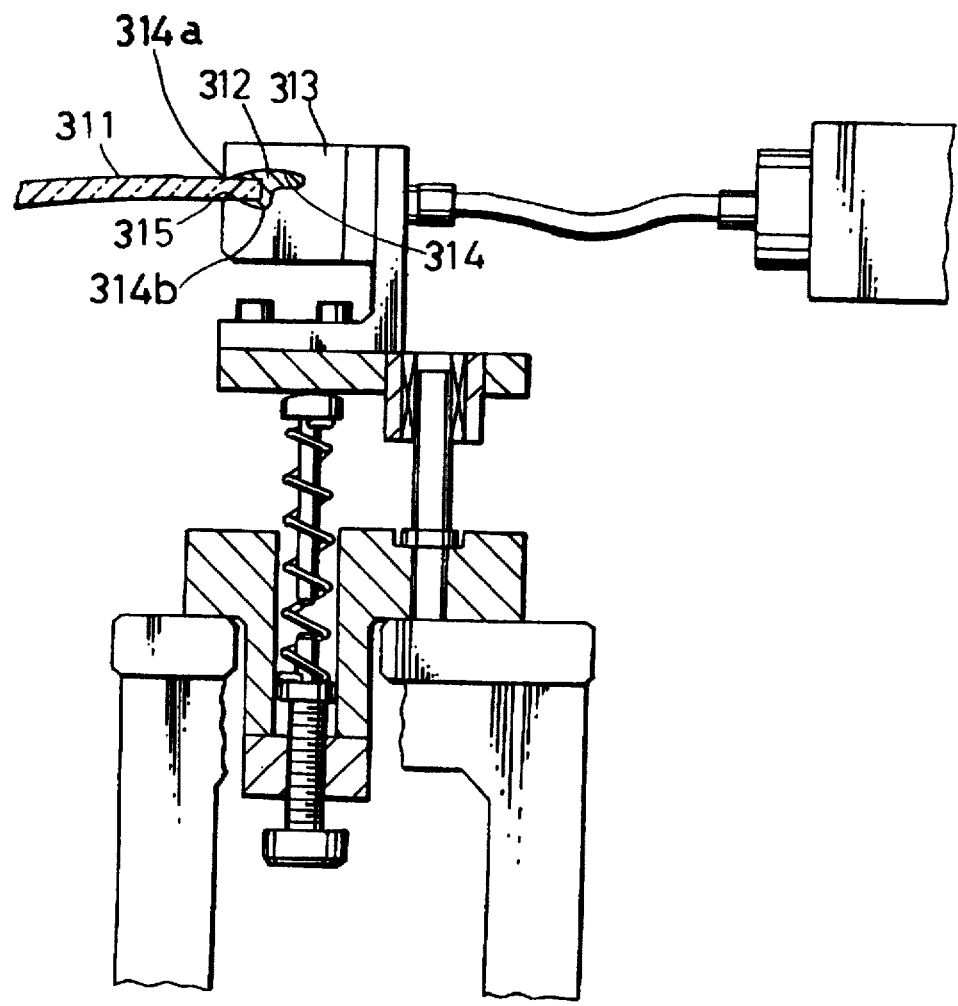
FIG. 5 is a side view, partly in section, of an extrusion molding machine according to a third embodiment of the present invention.

Referring to FIG. 5, shown therein is the third embodiment of the invention.

In this embodiment, a molding die 313 has a modified extrusion port 314 so as to form a windshield molding 312 which may cover an upper surface, an end surface and a lower surface of a peripheral edge of a windshield glass 311. The extrusion port 314 includes a side opening 314a which opens in a side surface of the molding die 313 so as to receive the peripheral edge of the windshield glass 311 and includes a molding opening 314b having a contour corresponding to the cross section of the windshield molding 312. Further, it is to be noted that a lower surface 315 of the side opening 314a may act as a windshield glass contacting surface of the molding die 313.

In the operation of the extrusion molding machine according to this embodiment, the peripheral edge of the windshield glass 311 is inserted into the extrusion port 314 through the side opening 314a so as to be seated on the lower surface 315 of the side opening 314a of the molding die 313.

Figure 6:
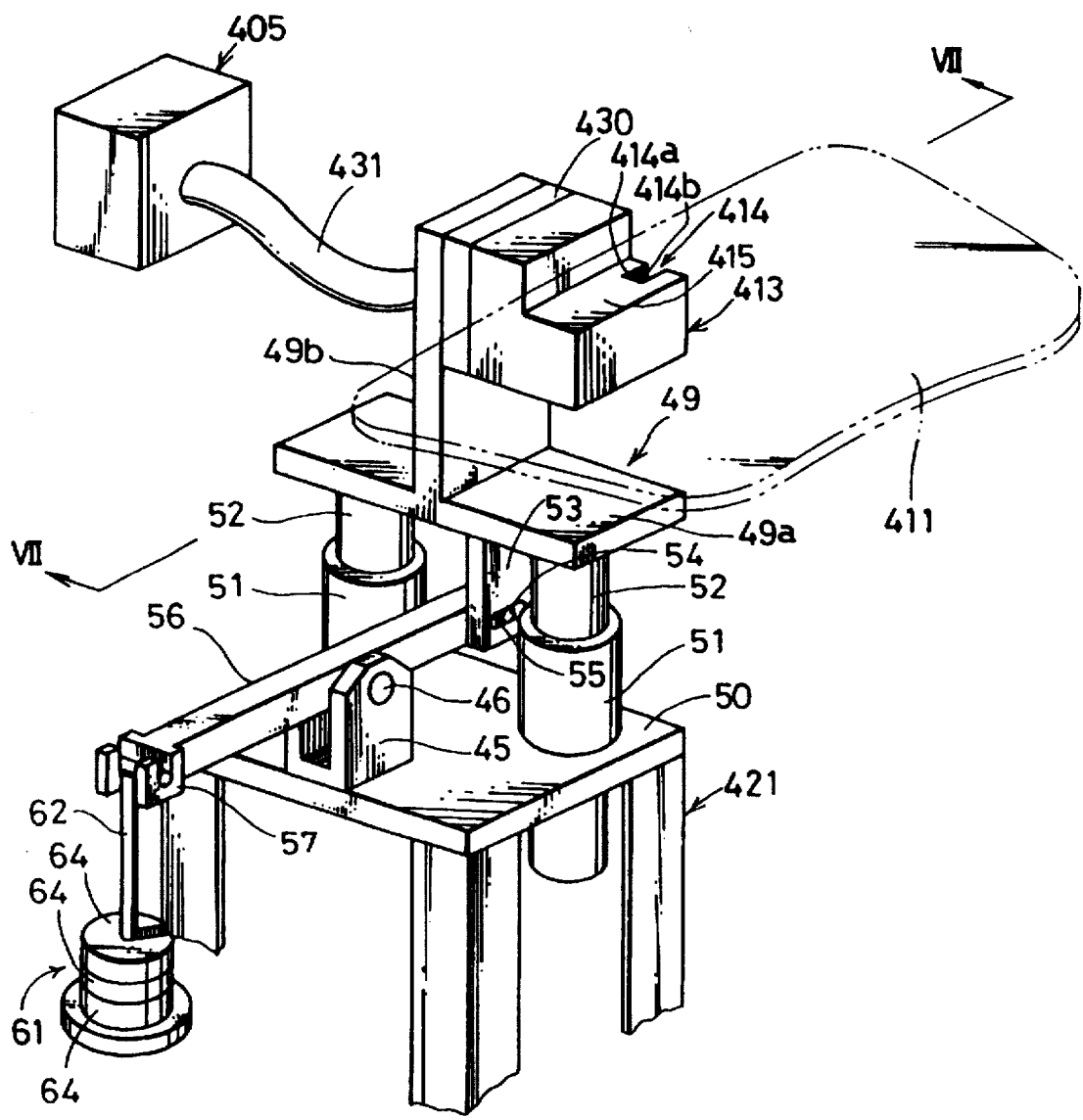
FIG. 6 is a perspective view of an extrusion molding machine according to a fourth embodiment of the present invention.
Figure 7:
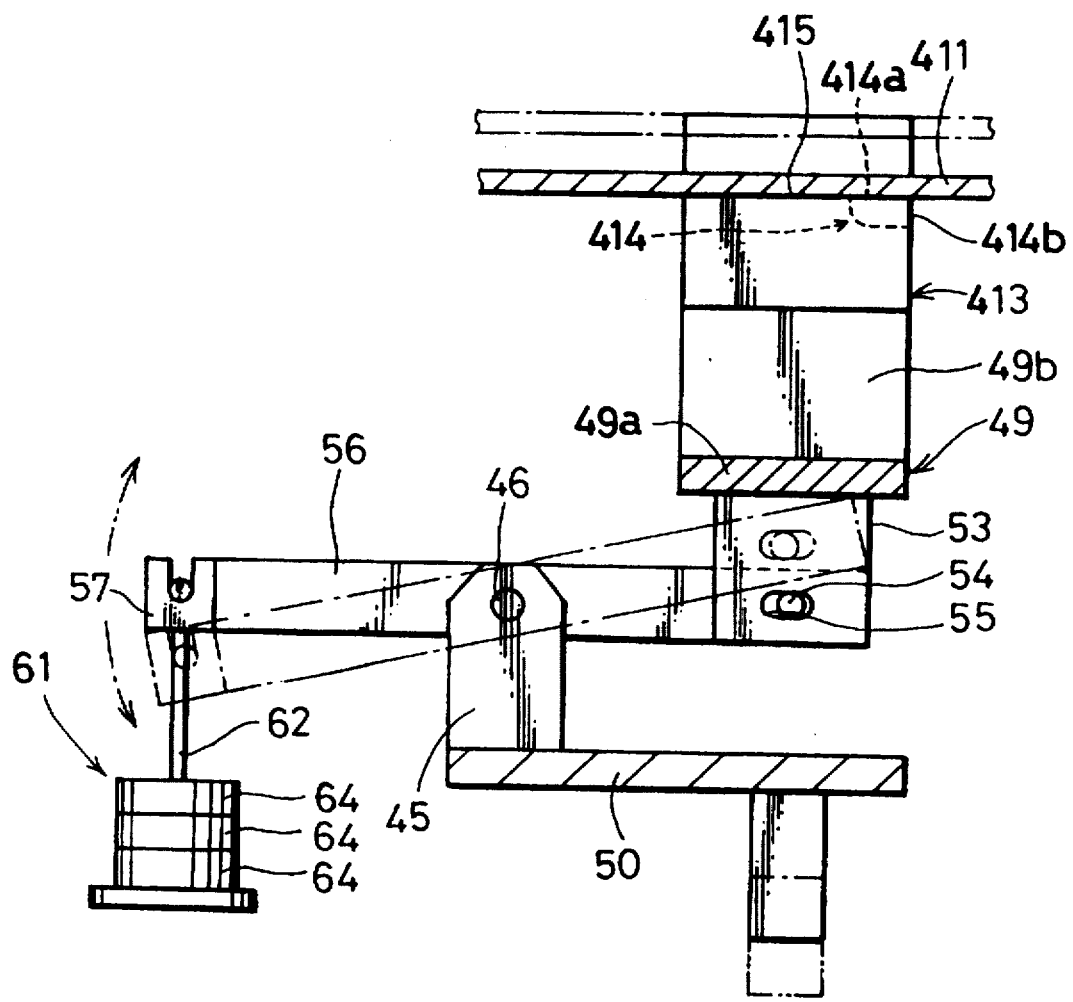
FIG. 7 is a sectional view taken along line VII—VII of FIG. 6.
Figure 8:
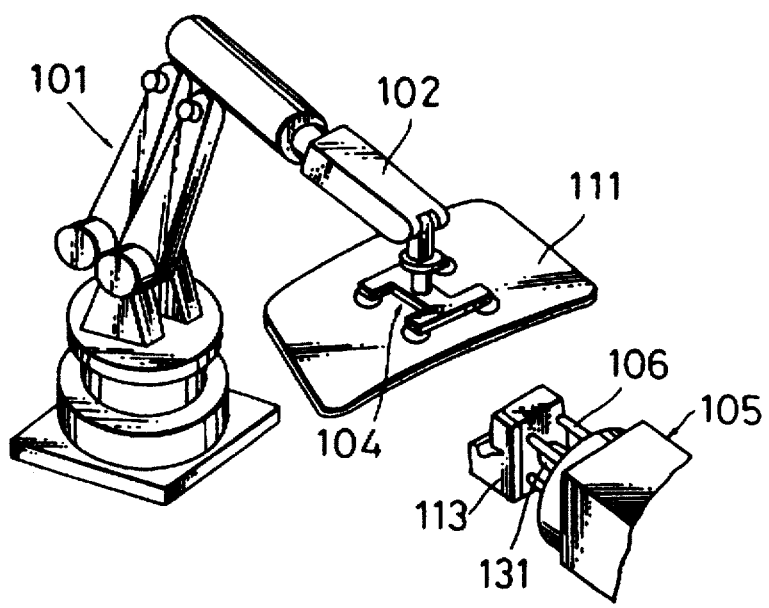
FIG. 8 is a perspective view of a conventional extrusion molding machine and a robot for handling a panel located near the extrusion molding machine.
Figure 9:
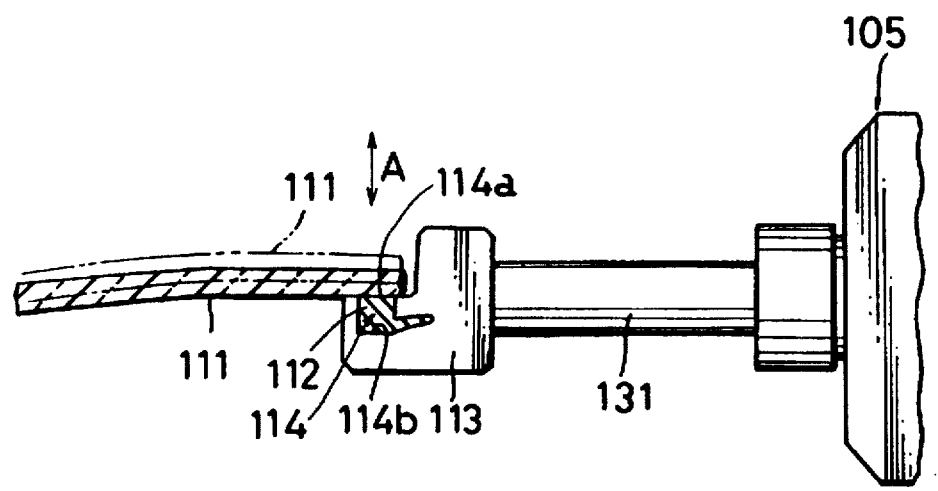
FIG. 9 is a side view of the conventional extrusion molding machine engaged with a panel, illustrating the operation thereof.
Figure 10:
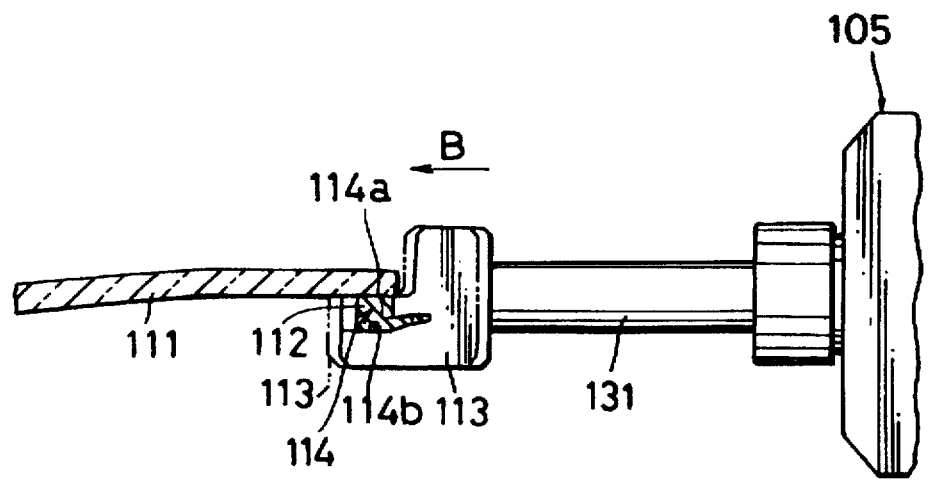
FIG. 10 is a side view of the conventional extrusion molding machine engaged with the panel of FIG. 9, illustrating the operation thereof.

Referring to FIGS. 6 and 7, shown therein is the fourth embodiment of the invention.

In this embodiment, an extrusion molding machine includes a molding die 413 for extruding the molding material to form a windshield molding (not shown) on a peripheral edge of the windshield glass 411, and a movable support 49 for supporting the molding die 413. The movable support 49 is vertically movably mounted on a fixture member 421.

The molding die 413 has an extrusion port 414 for forming the windshield molding along the peripheral edge of the windshield glass 411. The extrusion port 414 includes an upper opening 414a which opens in an upper surface or windshield glass contact surface 415 of the molding die 413 and includes a molding opening 414b having a configuration corresponding to the cross section of the windshield molding. The molding die 413 is coupled to an extruder 405 for feeding molding material through a flexible feeder pipe 431 so that molding material such as an elastomer is fed to the extrusion port 414 of the molding die 413. The movable support 49 includes a base plate 49a and a vertical support plate 49b integrally provided on the base plate 49a. The base plate 49a has a pair of vertical guide rods 52 mounted on a lower surface thereof. The support plate 49b is connected to the molding die 413 with an intervening heat insulator panel 430.

The fixture member 421 is fixed on a working floor (not shown) and has a support plate 50 mounted thereon. The support plate 50 is provided with a pair of vertical guide sleeves 51 studded thereon which are arranged to correspond to the guide rods 52. Each vertical guide sleeve 51 slidably receives each guide rod 52 therein.

The support plate 50 of the fixture member 421 is provided with a U-shaped retainer 45 on which a pivot arm 56 is pivotally mounted through a pivot pin 46. The pivot arm 56 has a hanger hook 57 integrally formed on one end thereof and a connector pin 54 provided on the other end thereof. The hanger hook 57 is removably provided with a weight unit 61 including a weight retainer 62 and a plurality of weight disks 64. As will be appreciated, weight of the weight unit 61 may be preferably controlled by changing the number of the weight disks 64. Further, some of the weight disks 64 may be those of different weight to facilitate control of the weight of weight unit 61.

On the other hand, the base plate 49a is provided with a connector plate 53 provided on a lower surface thereof. The connector plate 53 has a horizontally elongated slot 54 with which the connector pin 54 of the pivot arm 56 is movably engaged.

As will be easily understood, the weight unit 61 and the pivot arm 56 cooperate with each other to act as a pusher for the movable support 49. That is, the weight unit 61 produces force to create rotation of the pivot arm 56, thereby producing biasing force to upwardly force the connector plate 53 and in turn the movable support 49. The biasing force applied to the movable support 49 may be preferably controlled by changing the number of the weight disks 64 since it directly corresponds to the weight of the weight unit 61.

It is to be noted that with regard to the pivot arm 56, the length between the hanger hook 57 and the pivot pin 46 is dimensioned to be greater than that between the connector pin 54 and the pivot pin 46, so that the pivot arm 56 may effectively function as a lever with respect to the pivot pin 46. Additionally, the length of the slot 55 is previously determined so that the movable support 49 is vertically movable within a predetermined limited range.

The operation of the extrusion molding machine according to the fourth embodiment thus constructed will now be described.

The desired number of weight disks 64 are loaded on the weight retainer 62 so that the movable support 49 and the molding die 413 mounted thereon are positioned at the desired level shown by phantom lines in FIG. 7.

Thereafter, a robot (not shown) is driven to engage the peripheral edge of the windshield glass 411 with the windshield glass contact surface 415 of the molding die 413. When the peripheral edge of the windshield glass 411 is seated on the windshield glass contact surface 415, the molding die 413 and the movable support 49 are downwardly moved against the biasing force due to the weight unit 61. Thus, the molding die 413 is supported on a lowered level or standard level shown by solid lines in. FIG. 7 with the windshield glass contact surface 415 pressed to the peripheral edge of the windshield glass 411.

Subsequently, the extruder 405 is actuated to feed the molding material into the molding die 413 through the feeder pipe 431 so that the molding material is extruded from the extrusion port 414 of the molding die 413. Simultaneously, the robot is further driven by a signal corresponding to a predetermined operational program to continuously move the windshield glass 411 in such a manner that the extrusion port 414 of the molding die 413 moves along the peripheral edge of the windshield glass 411. Thus, the windshield molding is continuously formed on the peripheral edge of the windshield glass 411, thereby forming a panel unit.

The windshield glass 411 may have inherent variation in its curvature. Therefore, when the windshield glass 411 is continuously moved by the robot, the level of the peripheral edge thereof to contact the windshield glass contact surface 415 may necessarily vertically fluctuate. However, even if the level of the peripheral edge of the windshield glass 411 fluctuates, the windshield glass contact surface 415 of the molding die 413 may keep preferable contact with the peripheral edge of the windshield glass 411 without being apart from or excessively pressed to the peripheral edge of the windshield glass 411. This is because the windshield glass contact surface 415 is preferably pressed to the peripheral edge of the windshield glass 411 by the force due to the weight unit 61, as previously described.

As a result, the windshield molding as extruded is reliably adhered to the peripheral edge of the windshield glass 411. This may effectively prevent formation of a defective product. Additionally, the windshield glass 411 cannot be damaged since the windshield glass contact surface 415 is properly pressed to the peripheral edge of the windshield glass 411 during the extruding operation of the molding material.

According to this embodiment, the windshield glass contact surface 415 is extremely stably pressed to the peripheral edge of the windshield glass 411 since the force due to the weight unit 61 is kept substantially constant. This may further effectively prevent formation of a defective product and damage to the windshield glass 411.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An extrusion molding machine for manufacturing a panel unit including a panel and a frame mounted on a peripheral edge of the panel, the extrusion molding machine comprising:

floating molding die means for forming the frame on the peripheral edge of the panel by extrusion molding, said floating molding die means being adapted to follow the fluctuation of the peripheral edge of the panel caused by variation of curvature of the panel while maintaining a constant frame profile during frame application to said panel.

2. The extrusion molding machine as defined in claim 1, further comprising bias means for forcing said molding die means to the peripheral edge of the panel.

3. The extrusion molding machine as defined in claim 2, further comprising support means for supporting said molding die means, said support means being forced to the peripheral edge of the panel by said bias means.

4. The extrusion molding machine as defined in claim 3, further comprising a fixture member for movably supporting said support means, said bias means being mounted on said fixture member.

5. The extrusion molding machine as defined in claim 4, wherein said bias means comprises a spring of which one end engages said support means.

6. The extrusion molding machine as defined in claim 5, wherein said bias means comprises an adjusting member for adjusting spring force of said spring.

7. The extrusion molding machine as defined in claim 4, wherein said bias means comprises an arm member having one end and the other end, and a weight unit removably provided on one end of said arm member, said arm member being pivotally supported on said fixture member and engaged with said support means at the other end thereof.

8. The extrusion molding machine as defined in claim 7, wherein said weight unit comprises a plurality of weight strips.

9. The extrusion molding machine as defined in claim 2, further comprising damper means for forcing the peripheral edge of the panel to said molding die means.

10. The extrusion molding machine as defined in claim 1, wherein said molding die means are coupled to an extruder through a flexible feeder pipe.

* * * * *